Patented Apr. 25, 1933

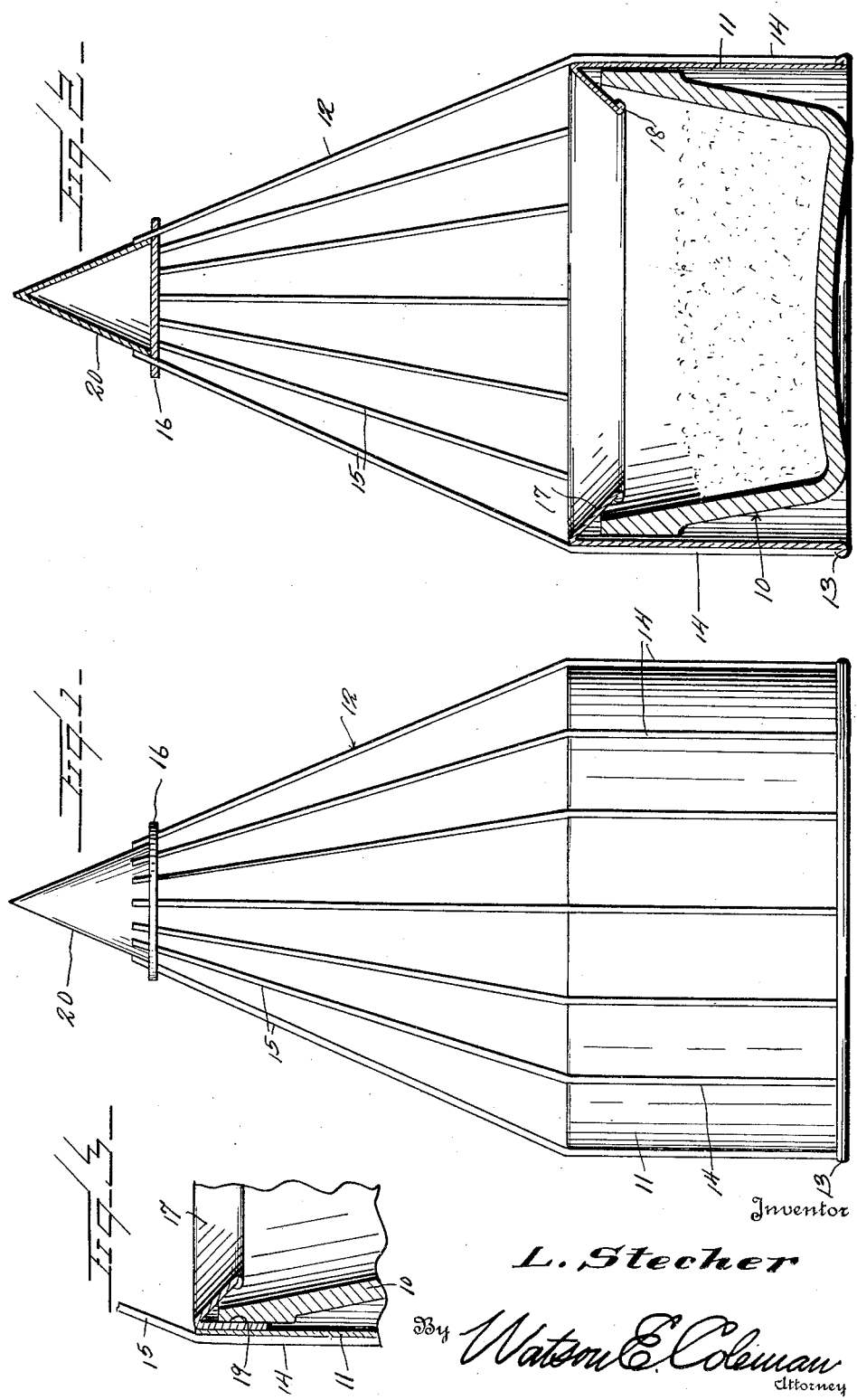

1,906,016

UNITED STATES PATENT OFFICE

LEOPOLD STECHER, OF WICHITA, KANSAS, ASSIGNOR OF ONE-THIRD TO KARL STECHER, OF WICHITA, KANSAS

POULTRY WATER AND FEED PROTECTOR

Application filed September 30, 1930, Serial No. 485,512. Renewed November 15, 1932.

The present invention relates to poultry water and feed protectors and more particularly to a protector of this kind which is adapted to be removably positioned over a feeding bowl or pan.

An object of this invention is to provide a protector of this kind which is so constructed as to substantially surround the feeding pan so as to prevent the poultry from standing on the edge of the feeding pan and unduly spilling the contents thereof.

Another object of invention is to provide a device of this kind which is so constructed as not to interfere with the feeding, the device being so constructed as to permit a relatively large number of chickens to feed at one time without interfering with each other or without spilling or otherwise spoiling the feed.

The above and various other objects and advantages of this invention will in part be described and in part be understood from the following detailed description of the present preferred embodiment, the same being illustrated in the accompanying drawing wherein:—

Figure 1 is a detail side elevation of a device constructed according to the preferred embodiment of this invention;

Figure 2 is a vertical sectional view taken substantially through the center of the device; and Figure 3 is a fragmentary vertical sectional view of a modification of the device.

Referring to the drawing wherein like numerals of reference designate corresponding parts throughout the several views, the numeral 10 designates a feeding pan or crock which is preferably annular or round in construction, the feeding device 10 being of any desired construction such as a crock or a metal pan. At the present time, when the feeding member 10 is positioned at a place convenient for removal of the food by the chickens or other poultry, the chickens frequently stand on the upper edge or rim of the device and throw or spill dirt into the pan and unduly waste the food. In order to permit a greater number of chickens or fowl to eat out of the feeding member 10 I have provided a protecting device comprising a body shield 11 of metal construction, being formed out of a sheet of metal and formed in annular or round form similar to the outer surface of the feeding member 10.

The body or shield member 11 is adapted to loosely engage about the periphery of the feeding member 10 and the lower edge thereof may be rolled or crimped as at 13, the lower edge 13 being adapted to be positioned on the ground. A plurality of protecting bars generally designated as 12 are positioned on the outer surface of the body shield 11, the bars 14 being secured to the outer surface of the body 11 by any desired means as by soldering or the like.

The bars 12 extend upwardly from the upper edge of the shield 11 in converging relation as at 15 and the upper ends of the converging members are secured to a plate 16 by means of soldering or the like. The protecting bars 12 are positioned at spaced points around the outer surface of the shield 11 the distance of the bars one from the other being such as to permit the fowl to readily project their heads between the bars so as to remove the food from the receptacle 10. As disclosed in Figure 2, the upper end of the shield or body member 11 is bent inwardly so as to provide an inverted frusto-conical shield 17, the lower edge portion 18 of which is crimped inwardly so as not to present a sharp edge to the beaks or bills of the fowl when feeding from the receptacle.

The shield 17 is adapted to overlie the upper end of the feeding member 10 so that when the fowl are removing the food from the member 10, any excess food adhering to the beaks of the fowl may be brushed or wiped off on the protecting shield 17. As shown in Figure 3, the protecting shield 17 is removably secured within the body 11, the shield 17 being provided with a depending apron 19 which is adapted to engage against the outer surface of the shield 11.

A cone 20 is mounted on the plate 16 and is adapted to prevent the chickens or other fowl from roosting on the plate 16.

In the use of this device, the food may be placed in the member 10 as by first withdrawing or removing the shield 11 with the bars 12 from about the feeding member 10 whereupon the device may be slipped over the feeding member 10 and the chickens permitted to remove or eat the food therefrom.

It is, of course, understood that various changes and modifications may be made in the details of construction and design of the above specifically described embodiment of this invention without departing from the spirit thereof, such changes and modifications being restricted only by the scope of the following claims:

What is claimed is:—

1. A feed protector of the character described to be disposed about an open receptacle comprising a vertically disposed cylindrical base portion having an open bottom, a plurality of upwardly extending and inwardly converging protecting members positioned about the periphery of the base in spaced relation to each other, means for securing the upper ends of said protecting members in spaced relation to each other, an inwardly extending inverted frusto-conical shield secured to the upper end of said base and disposed over the open end of the receptacle, and a cone shaped member positioned on the upper surface of said securing means.

2. A feed protector of the character described comprising a vertically disposed cylindrical base portion to be positioned about the periphery of a feed receiving member having an open top, a plurality of upwardly and inwardly extending feed protecting members secured to said base in spaced relation to each other, an apertured plate adapted to receive the upper ends of said protecting members and hold said upper ends in spaced relation to each other, and an inverted frusto-conical shield disposed within said base and overlying the upper edge of said feed receiving member.

3. A feed protector of the character described comprising a vertically disposed cylindrical base portion open at the bottom to surround an annular feed receiving member, a plurality of upwardly extending and inwardly converging feed protecting members secured in spaced relation to each other about the periphery of said base, an upper apertured plate secured to said protecting members adjacent the upper ends thereof to hold said protecting members in spaced relation to each other, a cone mounted on the upper surface of said upper plate, and an inwardly extending downwardly inclined shield mounted within the base and overlying the upper end of said feed receiving member.

In testimony whereof I hereunto affix my signature.

LEOPOLD STECHER.